2,742,514

DIMERIZATION OF MONOALKYL BENZENES

Abraham Schneider, Philadelphia, Pa., assignor to Sun Oil Company, Philadelphia, Pa., a corporation of New Jersey No Drawing. Application September 22, 1953, Serial No. 381,752

10 Claims. (Cl. 260—668)

This invention relates to a process for the dimerization of monoalkyl benzenes to produce unsymmetrical diarylalkanes.

The dimerization of polyalkyl benzenes under the influence of branched chain olefins and Friedel-Crafts catalysts has heretofore been described. In such processes, it was found essential, in order to produce an unsymmetrical diarylalkane, to employ a polyalkyl benzene having two alkyl substituents in para relationship.

It has now been found that certain monoalkyl benzenes can be dimerized by contacting the same with a tertiary olefin in the presence of hydrogen fluoride, the contacting being performed under specific reaction conditions as hereinafter described. For example, a specific embodiment of this invention provides a process for the dimerization of ethylbenzene by contacting ethylbenzene with isobutylene in the presence of aluminum chloride at a temperature of at least 100° C. The product formed is the dimer of ethylbenzene, which is 1-phenyl-1-p-ethylphenylethane, it being understood that minor quantities of the ortho and meta isomers thereof are also formed. This reaction is illustrated by the equation:

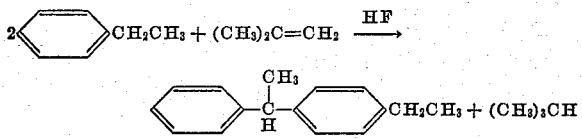

The formation of the paraffin corresponding to the tertiary olefin is always observed in this reaction and is characteristic thereof.

Monoalkyl benzenes which can be employed in the process of the invention have the formula

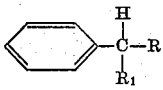

wherein R is an alkyl radical or a cycloalkyl radical having from 1 to 20 carbon atoms, and wherein $R_1$ is an alkyl radical or a cycloalkyl radical having from 1 to 20 carbon atoms or a hydrogen atom. The alkyl benzene thus has at least two carbon atoms in the alkyl group, and at least one hydrogen atom is attached to the carbon atom of the alkyl group which is joined to the benzene nucleus. The dimer products of the process are unsymmetrical diarylalkanes and have the formula

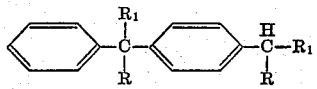

and are formed as above shown for the dimerization of ethylbenzene; R and $R_1$ are as above described. Ethylbenzene and cumene are preferred reactants in the present process. Other monoalkyl benzenes which may be employed include, for example, n-propylbenzene, secondary butylbenzene, secondary amylbenzene, phenylcyclohexylmethane, 1-phenyl-2-cyclohexylethane and the like. The monoalkyl benzene reactant is preferably substantially free of other hydrocarbons, and best results are obtained when the presence of other hydrocarbons is maintained below 10%. However, hydrocarbons which do not react under the conditions employed, such as normal paraffins, may be present to an extent of about 40% without adversely affecting the reaction. Isoparaffins react under the conditions employed and hence should not be present to an appreciable extent. Mononuclear aromatics other than the monoalkyl benzene reactant, such as benzene, should not be present in appreciable amounts, since they react with the monoalkyl benzene under the conditions herein employed as described in my copending application Serial No. 381,754, filed September 22, 1953.

By "tertiary olefins," as used herein, is meant a hydrocarbon having an olefinic double bond and at least one tertiary carbon atom. It is preferred to employ a tertiary olefin wherein the branched chain is attached to the unsaturated carbon atom. Preferred tertiary olefins include, for example, isobutylene, 2-methylbutene-2, 2-methylbutene-1, 2-methylpentene-2, 3-ethylpentene-2, 1-methylcyclohexene, 4-methylcyclohexene, and homologues and isomers thereof.

The mole ratio of tertiary olefin to monoalkyl benzene is preferably maintained within the range of from 0.1:1 to 1:1. Where the mole ratio is about 0.1:1, a relatively high yield of the diarylalkane based on conversion is obtained, while at higher mole ratios a higher total conversion is obtained. The quantity of hydrogen fluoride to employ is not critical but is advantageously maintained in excess. A mole ratio of hydrogen fluoride to tertiary olefin of from 1:1 to 20:1 is suitable.

It is essential to the successful operation of the present process that the temperature of reaction be maintained at least as high as 100° C. At temperatures of below 100° C., alkylation of the monoalkyl aromatic by the tertiary olefin is substantially the only reaction obtained, although disproportion is also observed at temperatures only slightly below 100° C. It is preferred to employ temperatures below 185° C. since at higher temperatures a wide variety of products is obtained due to reactions of the product under the influence of a catalyst. Accordingly, it is essential that the temperature of reaction be maintained at least as high as 100° C. and preferably is maintained at a temperature of not above 185° C. The pressure to employ is not critical so long as reaction is maintained in the liquid phase. In general, the pressure will vary from atmospheric up to about 500 p. s. i. Time is also not considered a critical variable, it being apparent that sufficient time should be allowed to obtain a substantial yield of the desired product. The usual time of reaction will be from 10 minutes to about 5 hours.

In carrying out the process of the invention, the tertiary olefin and hydrogen fluoride should not be contacted in the absence of the monoalkyl benzene. A preferred method of performing the process is to admix the monoalkyl benzene and hydrogen fluoride and to then add the tertiary olefin, with agitation, to the mixture.

The following example illustrates an embodiment of the invention:

Into a reactor equipped with agitating means and temperature control means was introduced 212 grams (2.01 moles) of ethylbenzene and 155 grams (7.75 moles) of hydrofluoric acid. To this continuously agitating mixture was added 57.5 grams (1.03 moles) of isobutylene over a period of 90 minutes. A temperature of the reaction mixture was maintained at a minimum of 100° C. and ranged from 100° C. to 105° C. A reaction mixture was allowed to stratify and the organic layer separated from the catalyst layer. The organic layer was distilled to separate the components thereof. There was recovered 33 g. (0.057 mole) of 1-phenyl-1-p-ethylphenylethane, the dimer of ethylbenzene.

Other products consisted of isobutane, 25.5 g. (0.044 mole); 29 g. benzene (0.37 mole); ethylbenzene 62.6 g. (0.59 mole); diethylbenzene, 34.4 g. (0.256 mole); tertiary butylethylbenzene, 7.3 g. (0.256 mole); and about 25 g. of higher boiling material.

The example shows operation close to the minimum temperature of 100 C. It will be observed that at this minimum temperature a substantial amount of the alkylation product of isobutylene and ethylbenzene, tertiary butylethylbenzene, was obtained. At higher temperatures, say about 125° C., substantially none of this product is obtained and the yield of the unsymmetrical diarylalkane dimer of ethylbenzene is enhanced.

The diarylalkane products of the present process can be used as lubricating oil additives, intermediates in the preparation of detergents, for the synthesis of other compounds, and the like.

When monoalkyl benzenes other than ethylbenzene and when t-olefins other than isobutylene, within the scope of the invention as above described, are employed, results substantially equivalent to those described in the example are obtained.

The invention claimed is:

1. Process of dimerizing a monoalkyl benzene which comprises reacting, in liquid phase at a temperature of from 100° C. to 185° C. in the presence of hydrogen fluoride, a tertiary olefin and a monoalkyl benzene having the formula

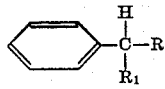

wherein R is a material selected from the group consisting of alkyl radicals having from 1 to 20 carbon atoms and cycloalkyl radicals having from 1 to 20 carbon atoms, and wherein $R_1$ is a material selected from the group consisting of a hydrogen atom, alkyl radicals having from 1 to 20 carbon atoms and cycloalkyl radicals having from 1 to 20 carbon atoms.

2. Process according to claim 1 wherein the monoalkyl benzene is ethylbenzene.

3. Process according to claim 1 wherein the monoalkyl benzene is cumene.

4. Process according to claim 1 wherein the monoalkyl benzene is n-propylbenzene.

5. Process according to claim 1 wherein the monoalkyl benzene is secondary butylbenzene.

6. Process according to claim 1 wherein the monoalkyl benzene is secondary amylbenzene.

7. Process for preparing 1-phenyl-1-p-ethylphenylethane which comprises contacting ethylbenzene with isobutylene and hydrogen fluoride in liquid phase at a temperature of from 100° C. to 185° C., and separating 1-phenyl-1-p-ethylphenylethane from the reaction mixture.

8. Process according to claim 7 wherein the isobutylene is added to a mixture of ethylbenzene and hydrogen fluoride.

9. Process for preparing 2-phenyl-2-isopropylphenylpropane which comprises contacting cumene with isobutylene and hydrogen fluoride in liquid phase at a temperature of from 100° C. to 185° C., and separating 2-phenyl-2-p-isopropylphenylpropane from the reaction mixture.

10. Process according to claim 9 wherein the isobutylene is added to a mixture of cumene and hydrogen fluoride.

References Cited in the file of this patent

UNITED STATES PATENTS 2,526,896   Ipatieff et al. _____ Oct. 24, 1950